US006455952B1

(12) United States Patent
Wang

(10) Patent No.: US 6,455,952 B1
(45) Date of Patent: Sep. 24, 2002

(54) ADJUSTMENT CIRCUIT FOR VOLTAGE DIVISION

(75) Inventor: Chi-Chang Wang, Hsinchu (TW)

(73) Assignee: Topro Technology Inc., Hsinchu (TW)

( * ) Notice: Subject to any disclaimer, the term of this patent is extended or adjusted under 35 U.S.C. 154(b) by 0 days.

(21) Appl. No.: 10/097,906

(22) Filed: Mar. 14, 2002

(30) Foreign Application Priority Data

Apr. 18, 2001 (TW) ........................................ 090206091

(51) Int. Cl.[7] .................................................. H02J 1/00
(52) U.S. Cl. .......................................... 307/15; 323/297
(58) Field of Search ............................ 307/15; 323/297

(56) References Cited

U.S. PATENT DOCUMENTS 5,867,057 A * 2/1999 Hsu et al. ..................... 307/15

* cited by examiner

*Primary Examiner*—Shawn Riley

(57) ABSTRACT

An adjustable circuit for voltage division comprises a serial resistor $R_n$(n=1, 2 . . . n) symmetrically mapped, connected in series, and paired in parallel with a switch $S_n$ or $S_n'$ apiece, wherein the switches $S_n$ and $S_n'$ are oppositely operated, namely, when the former is turned "ON/OFF", the latter is turned "OFF/ON" to thereby hold the current unchanged to obtain desired output voltage(s) by proper control of the switches and accordingly a valid portion of voltage-dividing resistor ΔR'.

9 Claims, 5 Drawing Sheets

ADJUSTMENT CIRCUIT FOR VOLTAGE DIVISION

FIELD OF THE INVENTION

This invention relates generally to an adjustment circuit for voltage division, particularly to an adjustment circuit applicable to a voltage divider with constant current for adjusting divided resistance or resolution in a respectively larger scope while keeping the total resistance unchanged.

BACKGROUND OF THE INVENTION

A voltage divider is implemented frequently in circuits to divide voltage for output of an expected voltage value. For convenience, an adjustable voltage divider is preferred for trimming in the case an offset to some extent is found in the value of the expected output voltage.

In a conventional adjustment method shown in FIG. 1, a serial resistor $R_n$(n=0, 1, 2 . . . N) is connected in series and paired in parallel with a corresponding switch $S_0$, $S_1$ . . . $S_N$ apiece to form an adjustable voltage-dividing resistor ΔR, and an output voltage $V_o$ equal to $V_{dd}(R_{out}+\Delta R')/(R_{in}+R_{out}+\Delta R)$ is obtained (where ΔR' is a valid portion of voltage-dividing resistor equal to 0 or ΔR). Examples are presented as in the following:

If the switches $S_A$ and $S_B$ are turned "ON" while the rest switches don't care, then $$V_o=V_{dd}\times R_{out}\div(R_{in}+R_{out}).$$

If the switch $S_A$ is turned "ON" only while the rest switches are turned "OFF"; then $$V_o=V_{dd}\times(R_{out}+R_0+R_1+R_2+R_3+ \ldots +R_n)/(R_{in}+R_{out}+R_0+R_1+R_2+R_3+ \ldots +R_n).$$

If the switches $S_A$ and $S_0$ are turned "ON" while the rest switches are turned "OFF"; then $$V_o=V_{dd}\times(R_{out}+R_1+R_2+R_3+ \ldots +R_n)/(R_{in}+R_{out}+R_1+R_2+R_3+ \ldots +R_n).$$

If the switches $S_A$, $S_0$, and $S_1$ are turned "ON" while the rest switches are turned "OFF"; then $$V_o=V_{dd}\times(R_{out}+R_2+R_3+R_4+ \ldots +R_n)/(R_{in}+R_{out}+R_2+R_3+R_4+ \ldots +R_n).$$

If the switch $S_B$ is turned "ON" only while the rest switches are turned "OFF"; then $$V_o=V_{dd}\times R_{out}/(R_{in}+R_{out}+R_0+R_1+R_2+R_3+ \ldots +R_n).$$

If the switch $S_B$ and $S_0$ are turned "ON" while the rest switches are turned "OFF"; then $$V_o=V_{dd}\times R_{out}/(R_{in}+R_{out}+R_1+R_2+R_3+ \ldots +R_n).$$

If the switches $S_B$, $S_0$, and $S_1$ are turned "ON" while the rest switches are turned "OFF"; then $$V_o=V_{dd}\times R_{out}/(R_{in}+R_{out}+R_2+R_3+R_4+ \ldots +R_n).$$

The switches are properly controlled such that the adjustable voltage-dividing resistor ΔR can be adjusted proportionally to obtain a desired output voltage Vo. Now, suppose $R_n=2^nR$, then $\Delta R=(S_02^0+S_12^1+ \ldots +S_n2^n)R$, where $S_n$ is 0 or 1. When $S_n$ in FIG. 1 is turned "ON", $S_n$ is 0, otherwise, $S_n$ is 1 and R=1 accordingly, so that ΔR is adjustable proportionally in the range of $(S_02^0+S_12^1+ \ldots +S_n2^n)$ as mentioned. However, such a voltage divider structure is inapplicable to a voltage division system that requires a constant current because of its variable resultant resistance and current, and is defective in adjusting or providing multiple outputs $V_o$.

For improvement, an amended design has been proposed later on as shown in FIG. 2, wherein an adjustable voltage-dividing resistor ΔR comprises a serial resistor $R_n$ including resistor $R_0$, $R_1$, $R_2$, . . . $R_n$ connected in series and corresponding switch $S_0$, $S_1$, . . . $S_n$ in parallel to obtain an output voltage $V_{01}=V_{dd}\times(R_{out\ 1}+R_{out\ 2}+\Delta R_1'+\Delta R_2)/(R_{in}+R_{out\ 1}+R_{out\ 2}+\Delta R_1+\Delta R_2)$, where $\Delta R_1'$ is a variable and another output voltage $V_{02}=V_{dd}\times(R_{out\ 2}+\Delta R_2')/(R_{in}+R_{out\ 1}+R_{out\ 2}+\Delta R_1+\Delta R_2)$, where $\Delta R_2'$ is a variable.

Taking $V_{01}$ for example, adjustment may be made as the following:

If the switch $S_0$ is turned "ON" while the rest switches are turned "OFF", then $$V_{01}=V_{dd}\times(R_{out\ 1}+R_{out\ 2}+R_0+R_1+ \ldots +R_n+\Delta R_2)/(R_{in}+R_{out\ 1}+R_{out\ 2}+R_0+R_1+ \ldots +R_n+\Delta R_2).$$

If the switch $S_1$ is turned "ON" while the rest switches are turned "OFF", then $$V_{01}=V_{dd}\times(R_{out\ 1}+R_{out\ 2}+R_1+ \ldots +R_n+\Delta R_2)/(R_{in}+R_{out\ 1}+R_{out\ 2}+R_0+R_1+ \ldots +R_n+\Delta R_2).$$

The variable valid voltage-dividing resistor $\Delta R_1'$ can be adjusted to obtain a desired or multiple outputs $V_o$ by controlling the switches properly in a voltage division system operated under a constant current, whereas, the voltage-dividing resistor ΔR is not suited to be adjusted proportionally in the range of $(S_02^0+S_12^1+ \ldots +S_n2^n)$.

SUMMARY OF THE INVENTION

The primary object of this invention is to provide an adjustment circuit for voltage division, which is implemented in an adjustable voltage-dividing resistor ΔR comprising a symmetrically mapped serial resistor($R_n$) and paired switches($S_n$), wherein a valid portion of voltage-dividing resistor ΔR' can be adjusted proportionally in the range of $(S_0R_0+S_1R_1+ \ldots +S_nR_n)$.

For more detailed information regarding advantages or features of this invention, at least an example of preferred embodiment will be elucidated below with reference to the annexed drawings.

BRIEF DESCRIPTION OF THE DRAWINGS

The related drawings in connection with the detailed description of this invention, which is to be made later, are described briefly as follows, in which.

DETAILED DESCRIPTION OF THE INVENTION

Figure 1:
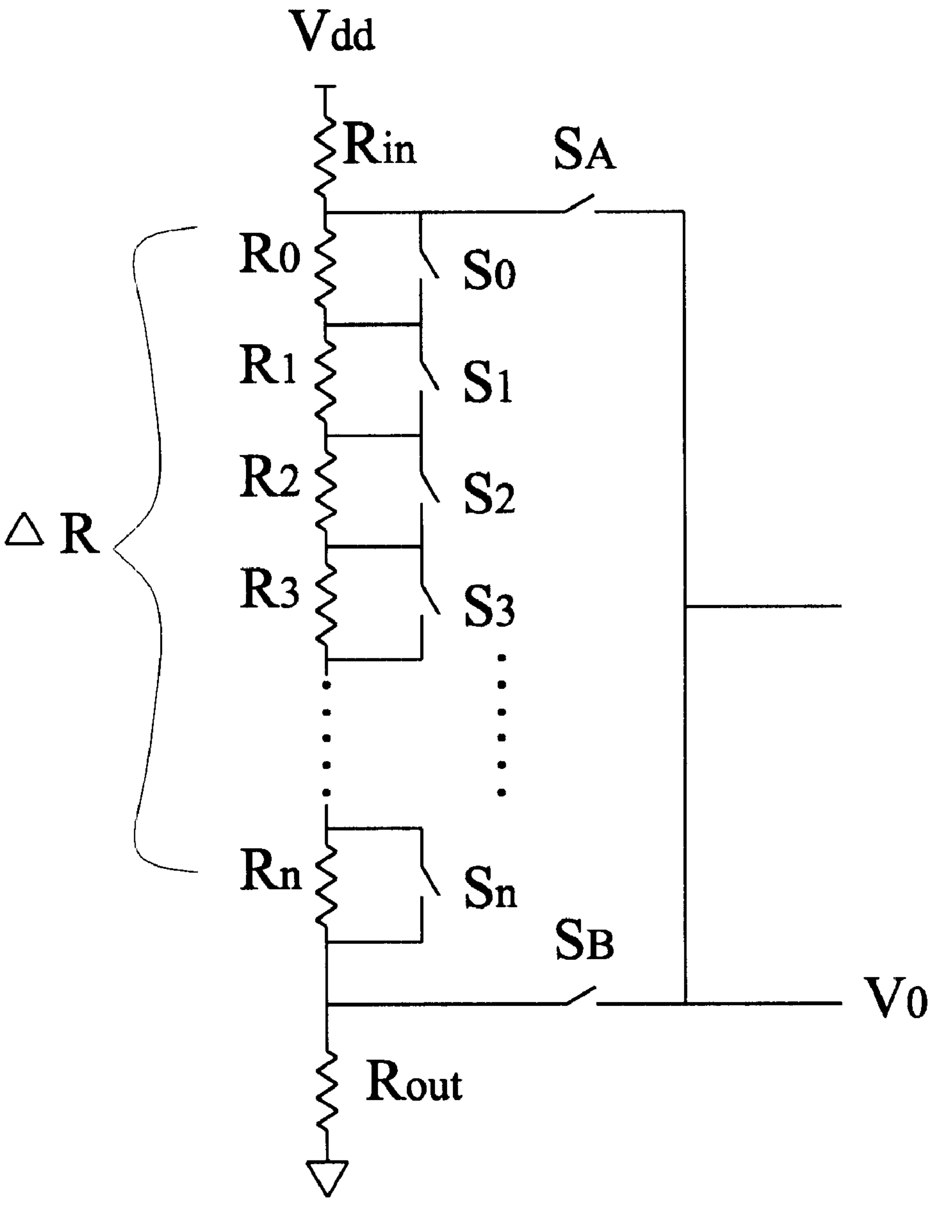
FIG. 1(PRIOR ART)
FIG. 1 shows a conventional adjustment circuit for voltage division.
Figure 2:
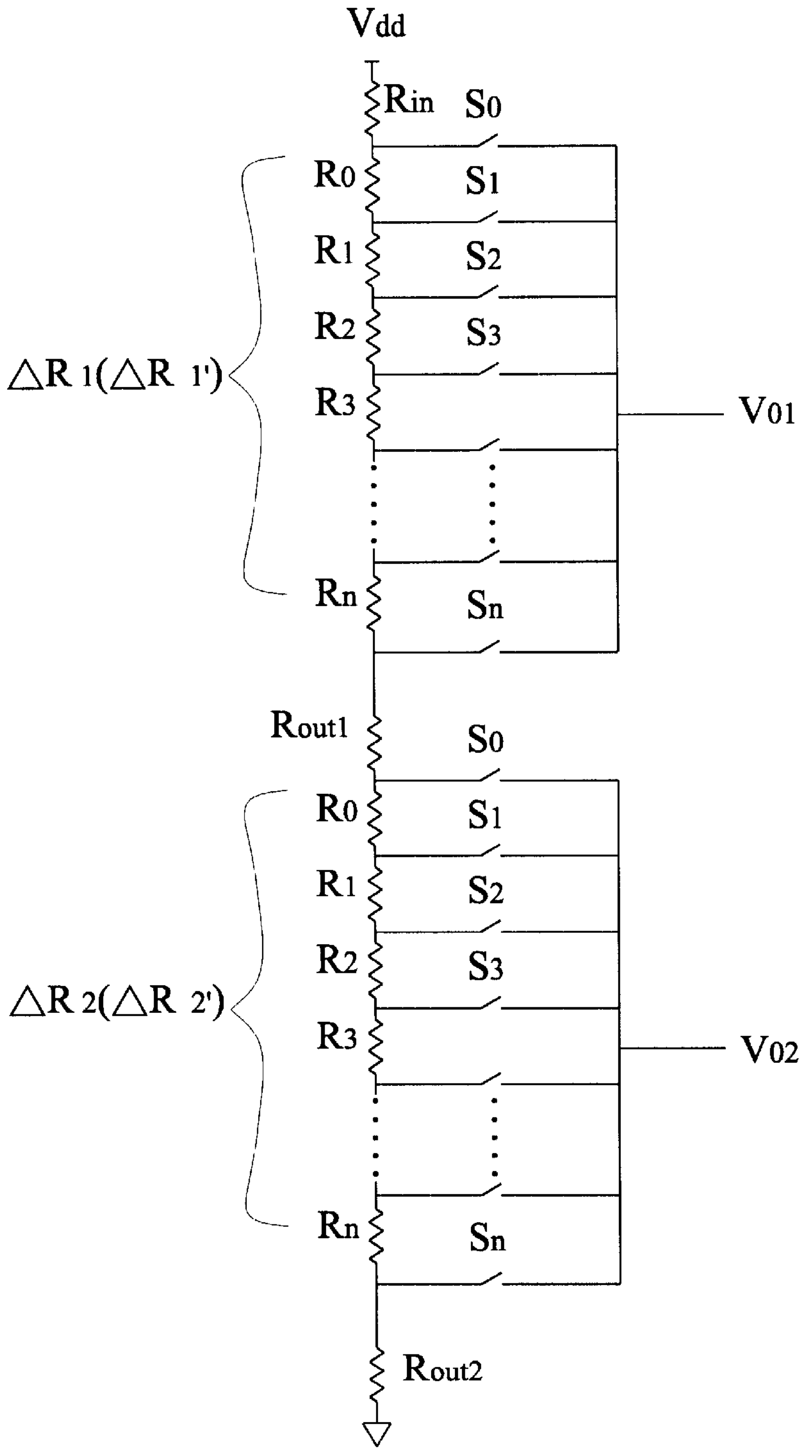
FIG. 2(PRIOR ART)
FIG. 2 shows another conventional adjustment circuit for voltage division.
Figure 3:
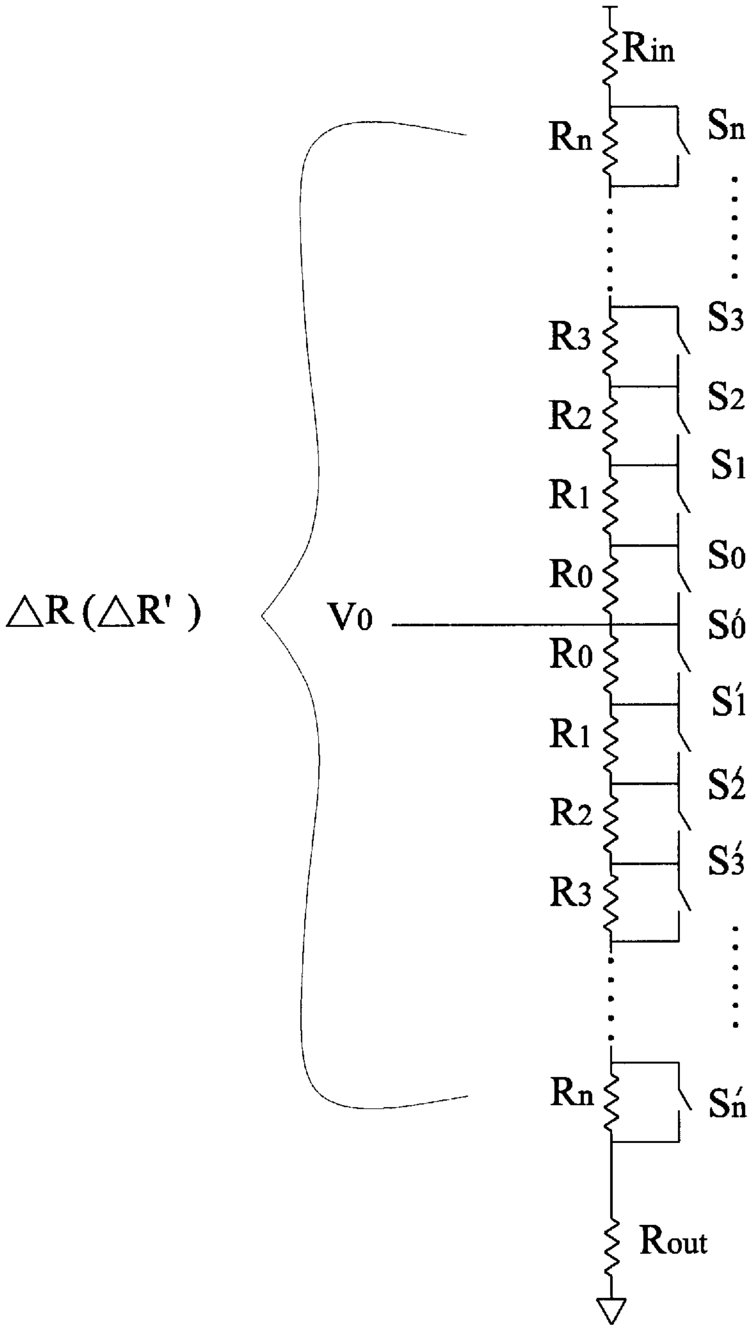
FIG. 3 shows an adjustment circuit of this invention for voltage division.
Figure 4:
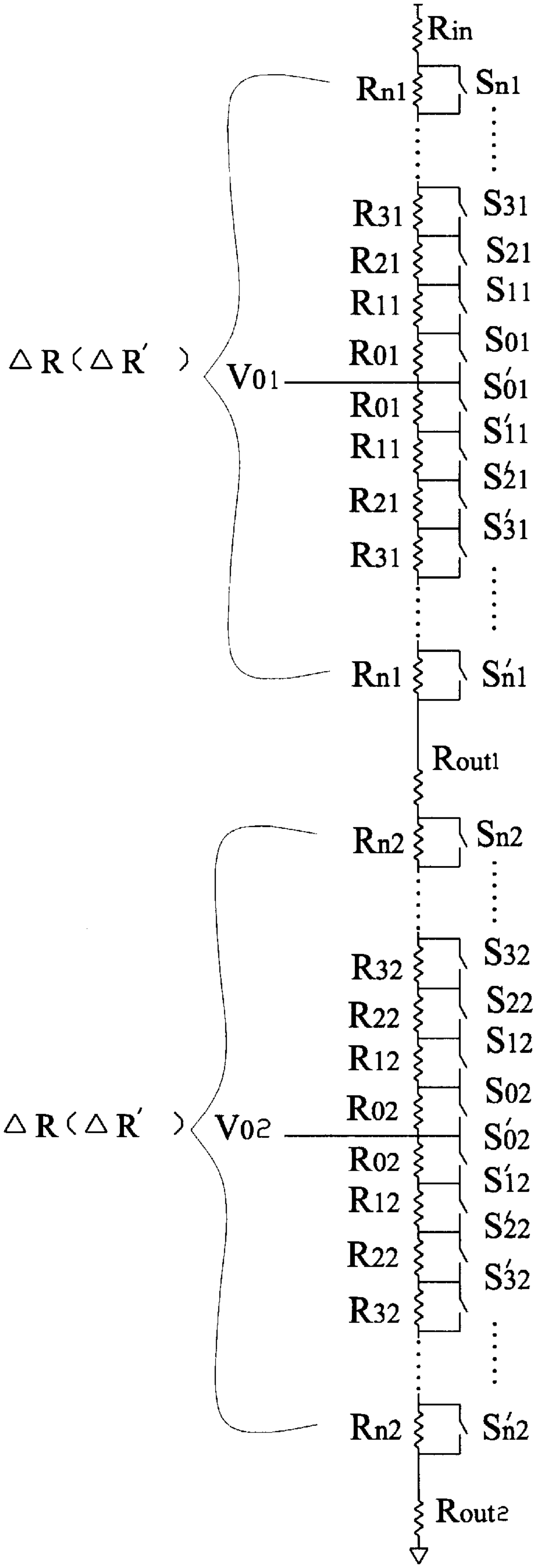
FIG. 4 shows a preferred embodiment of the adjustment circuit for multiple output voltage division.
Figure 5:
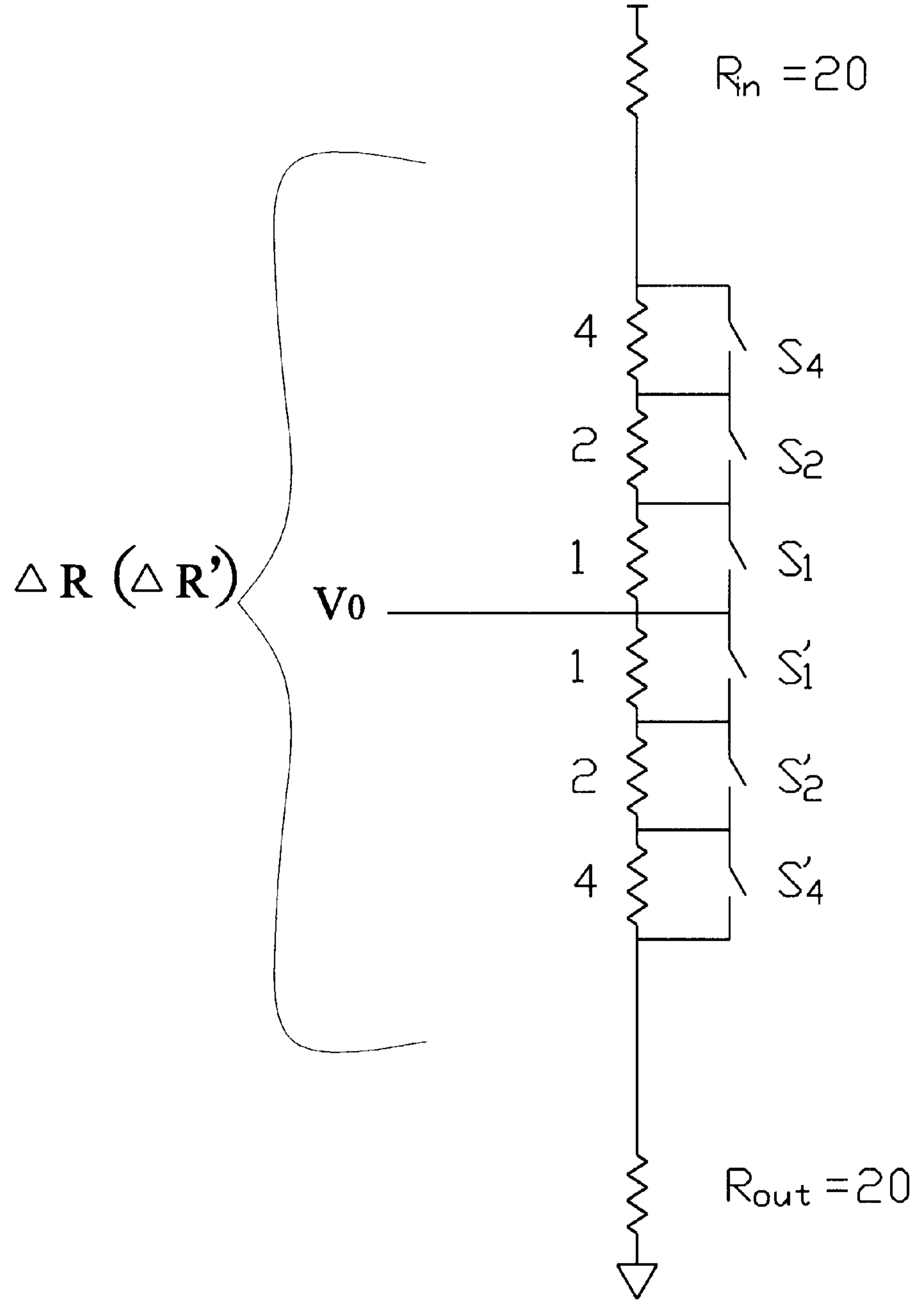
FIG. 5 shows an example of the adjustment circuit for voltage division.

In an adjustment circuit for voltage division of this invention shown in FIG. 3, a serial resistor $R_n$(n=1, 2 . . . n)

is mapped symmetrically, connected in series, and paired in parallel with a switch Sn or Sn' apiece to hold valid an equation $V_o=V_{dd}(R_{out}+\Delta R')/(R_{in}+R_{out}+\Delta R)$ (where $\Delta R=R_0+R_1+\ldots+R_n'$ and $\Delta R'$ is a valid portion of voltage-dividing resistor variable depending on control of the $S_n$ and $S_n'$ serial switches; $V_o$ is the output voltage). The switch $S_n$ and $S_n'$ are operative oppositely, namely, when the switch $S_n$ is turned "ON/OFF", the switch $S_n'$ is turned "OFF/ON" on the contrary. A voltage division architecture of this kind is applicable to a voltage division system with constant current and expandable for control of multiple outputs (shown in FIG. 4). If $R_n=2^nR$, then the valid portion of voltage-dividing resistor $\Delta R'$ can be adjusted proportionally in the range of $(S_0 2^0+S_1 2^1+\ldots+S_n 2^n)$. Several examples are presented below with reference to the adjustment circuit for voltage division shown in FIG. 5.

Suppose $R_{in}=20$, $R_{out}=20$, $\Delta R=1+2+4=7$, thus:

if the switches $S_1$, $S_2$, and $S_4$ are turned "OFF" (namely, the switches $S_1'$, $S_2'$, and $S_4'$ are turned "ON"), then $$V_o=20/(20+20+7);$$

if the switch $S_1$, $S_2$, and $S_4'$ are turned "OFF" (namely, the switches $S_1'$, $S_2'$, and $S_4$ are turned "ON"), then $$V_o=(20+4)/(20+20+7);$$

if the switch $S_1$, $S_2'$, and $S_4'$ are turned "OFF" (namely, the switches $S_1'$, $S_2$, and $S_4$ are turned "ON"), then $$V_o=(20+2+4)/(20+20+7);$$

if the switches $S_1'$, $S_2'$, and $S_4'$ are turned OFF (namely, the switches $S_1$, $S_2$, and $S_4$ are turned ON), then $$V_o=(20+1+2+4)(20+20+7);\text{ and}$$

if the switches $S_1'$, $S_2$, and $S_4'$ are turned OFF (namely, the switches $S_1$, $S_2'$, and $S_4$ are turned ON), then $$V_o=(20+1+4)/(20+20+7).$$

Hence, this invention can be utilized to adjust $\Delta R'$, the valid portion of voltage-dividing resistor $\Delta R$, proportionally in a range including the combinations from 0 to 7, and expansively, in the range of $(S_0 2^0+S_1 2^1+\ldots+S_n 2^n)$ under a constant current without changing the total resistance.

Besides, the valid portion of voltage-dividing resistance $\Delta R'$ can be adjusted bi-directionally ($\pm\Delta R'$) to provide a wider flexible range in circuit design.

For example, if the switches $S_1$, $S_2$, and $S_4'$ are turned "OFF" (namely, the switches $S_1'$, $S_2'$, and $S_4$ are turned "ON"), then $$V_o=24/(20+20+7);$$

now the conditions are changed that the switches $S_1$, $S_2$, and $S_4$ are turned "OFF" (namely, the switches $S_1'$, $S_2'$, and $S_4'$ are turned "ON"), then $$V_o=(24-4)/(20+20+7).$$

Therefore, the adjustment circuit for voltage division of this invention can be bi-directionally adjusted ($\pm\Delta R'$) so as to flexibly enlarge the adjustable range.

In the above described, at least one preferred embodiment has been described in detail with reference to the drawings annexed, and it is apparent that numerous variations or modifications may be made without departing from the true spirit and scope thereof, as set forth in the claims below.

What is claimed is:

1. An adjustment circuit for voltage division having an adjustable voltage-dividing resistor $\Delta R$ composed of a serial resistor $R_n$(n=0, 1, 2 . . . n) mapped symmetrically, connected in series, and paired in parallel with a switch $S_n$ or $S_n'$ apiece, wherein the switches $S_n$ and $S_n'$ are oppositely operated, namely, if $S_n$ is turned "ON/OFF", $S_n'$ is turned "OFF/ON" to thereby adjust a valid portion of the voltage-dividing resistor $\Delta R$ proportionally for obtaining a desired output voltage by controlling the switches $S_n$ and $S_n'$(n=0, 1, 2 . . . n).

2. The adjustment circuit according to claim 1, wherein the symmetrical serial resistor $R_n$ equals $2^nR$.

3. The adjustment circuit according to claim 1, wherein the initial state of the adjustment circuit is set that the switch $S_1, S_2 \ldots S_n'$ are turned "OFF" while the switches $S_1', S_2' \ldots S_n$ are turned "ON".

4. The adjustment circuit according to claim 2, wherein the initial state of the adjustment circuit is set that the switches $S_1, S_2 \ldots S_n'$ are turned "OFF" while the switches $S_1', S_2' \ldots S_n$ are turned "ON".

5. An adjustment circuit for voltage division, comprising:

an input resistor $R_{in}$;

an output resistor $R_{out}$; and an adjustable voltage-dividing resistor $\Delta R$ further comprising a symmetrically mapped serial resistor $R_n$(n=1, 2 . . . n), connected in series, and paired in parallel with a switch $S_n$ or $S_n'$ apiece, wherein the switch $S_n$ is operative oppositely against the switch $S_n'$, namely, when the switch $S_n$ is turned "ON", the switch $S_n'$ is turned "OFF" and vice versa, so that the output voltage $V_o=V_{dd}(R_{out}+\Delta R')/(R_{in}+R_{out}+\Delta R)$ is always held valid, where $\Delta R=(R_{0+R1}+R_2+\ldots+R_n)$ and $\Delta R'$ is a variable depending on control of the switches and applicable in the range of $(S_0R_0+S_1R_1+\ldots+S_nR_n)$.

6. The adjustment circuit according to claim 5, wherein the symmetrical serial resistor $R_n$ equals $2^nR$.

7. The adjustment circuit according to claim 5, wherein the input resistor $R_{in}$ is further connected in series with the adjustable voltage-dividing resistor $\Delta R$ and the output resistor $R_{out}$ for providing multiple outputs.

8. The adjustment circuit according to claim 5, wherein the initial state of the adjustment circuit is set that the switches $S_1, S_2, \ldots,$ and $S_n'$ are turned "OFF" while the switches $S_1, S_2', \ldots$ and $S_n'$ are turned "ON".

9. The adjustment circuit according to claim 6, wherein the initial state of the adjustment circuit is set that the switches $S_1, S_2, \ldots,$ and $S_n'$ are turned "OFF" while the switches $S_1', S_2', \ldots,$ and $S_n'$ are turned "ON".

* * * * *